United States Patent
Huttunen

(10) Patent No.: US 7,058,148 B1
(45) Date of Patent: Jun. 6, 2006

(54) METHOD FOR SELECTING MODULATION DETECTION IN RECEIVER, AND RECEIVER

(75) Inventor: Mikko Huttunen, Espoo (FI)

(73) Assignee: Nokia Networks Oy, Espoo (FI)

( * ) Notice: Subject to any disclaimer, the term of this patent is extended or adjusted under 35 U.S.C. 154(b) by 670 days.

(21) Appl. No.: 09/807,131

(22) PCT Filed: Aug. 9, 2000

(86) PCT No.: PCT/FI00/00675

§ 371 (c)(1),
(2), (4) Date: May 23, 2001

(87) PCT Pub. No.: WO01/11790

PCT Pub. Date: Feb. 15, 2001

(30) Foreign Application Priority Data

Aug. 10, 1999 (FI) ................... 19991696

(51) Int. Cl.
*H04L 7/00* (2006.01)

(52) U.S. Cl. ............ 375/354; 375/293; 375/355; 375/341; 375/343; 375/365; 375/149; 375/152

(58) Field of Classification Search ............ 375/354, 375/336, 231, 331, 340, 349, 147, 150, 343, 375/346, 355, 259, 365, 341, 224, 293, 149, 375/152; 370/335, 513

See application file for complete search history.

(56) References Cited

U.S. PATENT DOCUMENTS

| 4,713,829 A | * | 12/1987 | Eyuboglu .................... 375/259 |
| 5,140,617 A | * | 8/1992 | Kubo ......................... 375/365 |
| 5,199,047 A | * | 3/1993 | Koch ......................... 375/231 |
| 5,363,412 A | | 11/1994 | Love et al. |
| 5,533,066 A | * | 7/1996 | Yamaguchi et al. ......... 375/341 |
| 5,600,673 A | * | 2/1997 | Kimura et al. .............. 375/224 |
| 5,841,816 A | * | 11/1998 | Dent et al. .................. 375/331 |
| 5,946,359 A | * | 8/1999 | Tajiri et al. ................. 375/331 |
| 6,026,130 A | | 2/2000 | Rahmatullah et al. ...... 375/340 |
| 6,058,138 A | * | 5/2000 | Fukumasa et al. .......... 375/130 |
| 6,463,107 B1 | * | 10/2002 | Lindoff et al. .............. 375/343 |
| 6,714,609 B1 | * | 3/2004 | Keisala ....................... 375/349 |

FOREIGN PATENT DOCUMENTS

| WO | WO 96/11533 | 4/1996 |
| WO | WO 99/62190 | 12/1999 |
| WO | WO 00/48354 | 8/2000 |
| WO | WO 01/03397 | 1/2001 |

* cited by examiner

*Primary Examiner*—Stephen Chin
*Assistant Examiner*—Ted Wang
(74) *Attorney, Agent, or Firm*—Pillsbury Winthrop Shaw Pittman LLP

(57) ABSTRACT

A method for selecting a modulation detector in a receiver and a receiver which includes a first and a second modulation detector, mechanisms for determining at least one cross-correlation value between the stored training sequence and at least one training sequence of the received signal, and mechanisms for selecting the detector used for the detection of a signal to be received in response to the determined at least one cross-correlation value.

9 Claims, 1 Drawing Sheet

METHOD FOR SELECTING MODULATION DETECTION IN RECEIVER, AND RECEIVER

This application is the National Phase of International Application PCT/FI00/000675 filed Aug. 9, 2000 which designated the U.S. and that International Application was published under PCT Article 21(2) in English.

BACKGROUND OF THE INVENTION

The invention relates to a method for selecting a modulation detector in a receiver.

When information is transferred over a radio channel, a signal to be transmitted must be modulated. The purpose of modulation is to render the signal such that it can be transmitted at a radio frequency. One requirement of a good modulation method is, for example, that it enables the largest possible amount of information to be transferred on the narrowest possible frequency band. Depending on the use, other features can also be stressed. In addition, modulation must be such that it causes as little interference to a neighbouring channel as possible.

One modulation method is $\pi/4$-DQPSK ($\pi/4$-shifted, Differential Quaternary Phase Shift Keying) modulation. This modulation method comprises eight phase states but only four phase shifts. The allowed phase shifts (symbols) are $\pm\pi/4$ and $\pm3\pi/4$. Each phase shift corresponds to two bits to be transmitted. In other words, a digital signal modulates a carrier in two-bit sequences in such a manner that a given phase shift corresponds to each two-bit combination during each symbol sequence. A symbol sequence refers here to a signal sequence which is used for transmitting two bits. The phase shifts which correspond to bit combinations 00, 01, 10 and 11 are $\pi/4$, $3\pi/4$, $-\pi/4$ and $-3\pi/4$. For example, the symbol frequency employed by the Terrestrial Trunked Radio (TETRA) is 18 kHz, whereby the bit frequency is 36 kHz.

When a signal is received, it has to be demodulated, i.e. the bits that are modulated to the signal have to be detected by a detector in order to find out the information included therein. A receiver may comprise a plurality of detectors which are optimized for various channel conditions. In some conditions, a channel equalizer may also be needed. Selection of a detector to be used is generally implemented such that the detectors operate simultaneously and each produces a commensurable error-metric value, on the basis of which the detector that is best suited for the conditions can be selected.

The above-described arrangement has a drawback that as the detectors operate simultaneously, a considerable amount of computational power is required for calculating the detector algorithms. In particular, a channel equalizer that is possibly included in the detector requires heavy computational power.

BRIEF DESCRIPTION OF THE INVENTION

The object of the invention is thus to provide a method and equipment implementing the method such that the above drawbacks can be solved. This is achieved with a method and a receiver which are characterized by what is disclosed in the independent claims 1 and 6. The preferred embodiments of the invention are disclosed in the dependent claims.

The invention is based on the idea that a cross-correlation result obtained from symbol synchronization is utilized when assessing a suitable detector type required by the conditions on a radio channel.

The method and arrangement of the invention have an advantage that the number of calculations required for the detection can be minimized in the receiver, since simultaneous operation of a plurality of detectors is not needed. In particular, this is advantageous in terminal equipments having a limited computational capacity. By means of the invention, it is also possible to select the optimal detector type to suit the conditions on the radio channel.

BRIEF DESCRIPTION OF THE DRAWINGS

In the following, the invention will be described in greater detail in connection with preferred embodiments, with reference to the attached drawings, wherein.

DETAILED DESCRIPTION OF THE INVENTION

In the following, the invention is described in connection with the TETRA system with no intention to restrict the invention to any particular system or modulation method.

Figure 2:
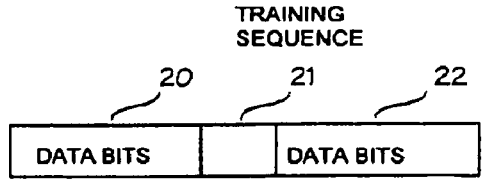
FIG. 2 is a simplified schematic view of a frame structure in the TETRA system.

In the TETRA system, information bits received from a medium access layer (MAC) of a transmission path are encoded by block coding and convolution coding so as to detect errors arising in the signal on a radio path and possibly correct them at reception. The encoded bits are interleaved such that successive bits are far apart from one another. This facilitates error correction if the signal to be transmitted is exposed to instantaneous interference on the radio path. The interleaved bits are mixed by using a given colour code, by means of which the transmissions of different base stations can be identified. In multiplexing, bits of different logical channels are combined. Thereafter, a burst is formed from the multiplexed bits. A burst is a structure which is transmitted in one time division multiple access (TDMA) time slot or sub-time slot. The burst is composed of data bit fields 20 and 22 and of a training sequence 21 between them in the middle of the burst, as illustrated in FIG. 2. The training sequence 21 is a predetermined bit sequence that is stored in the memory of a receiver such that a training sequence of the received signal can be compared with the stored training sequence. The training sequence 21 can be used for synchronizing the reception and for identifying the received signal, for example. Differential coding generates modulating symbols from pairs of bits in a burst. A carrier which is modulated by control of symbols is amplified in a transmitter and transmitted onto a radio path.

The modulation is the above-described $\pi/4$-DQPSK ($\pi/4$-shifted, Differential Quaternary Phase Shift Keying) modulation. This modulation method comprises eight phase states but only four phase shifts. The allowed phase shifts (symbols) are $\pm\pi/4$ and $\pm3\pi/4$. In practice, the $\pi/4$-DQPSK constellation thus varies at symbol intervals between two 4-point constellations.

Figure 1:
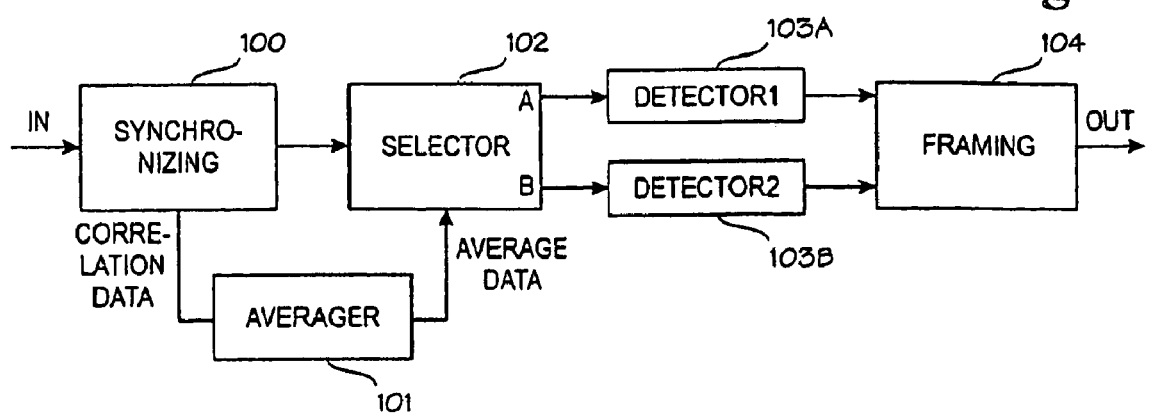
FIG. 1 is a block diagram of a receiver structure according to the invention.

FIG. 1 shows a block diagram of a receiver structure of the invention for the TETRA system, for instance. Only the parts of the receiver that are relevant to the understanding of the invention are shown. In reception, a signal is received from an antenna (not shown) and the signal is first processed by radio-frequency parts (not shown). Thereafter, A/D converters (not shown) take samples from the intermediate frequency signal. The samples are supplied to a synchronizing block 100, as illustrated by signal IN in FIG. 1. The synchronizing block 100 searches the obtained samples for a training sequence 21 belonging to the frame structure. Thereby the synchronizing block is able to accurately determine an ideal sampling moment, i.e. positions of all symbols in a sample stream. This is also known as symbol synchronization. It is carried out by calculating a complex cross-correlation between the training sequence 21 of the received signal burst and the stored training sequence at different sampling moments. Generally, cross-correlation refers to an integral of the product of two signals, which indicates how well the signals correspond. Thus, the sampling moment of the received signal producing the maximum cross-correlation value is the ideal sampling moment and synchronization is carried out accordingly in a known manner. In the described example in connection with the TETRA system, the cross-correlation to be calculated is complex, since the signal IN is a complex signal. The synchronizing block 100 also controls the radio-frequency parts of the receiver in order that the signal arriving in the A/D converter would stay at an optimal level.

According to the basic idea of the invention, correlation data obtained from synchronization 100 is utilized in assessing a detector type 103A or 103B required by the radio channel conditions. Thus, the maximum of the cross-correlation result obtained from synchronization 100 corresponds to the ideal synchronization point, as described above. In an ideal case, when there is no interference on the radio path, the cross-correlation zero points are located before and after the ideal synchronization point, at a distance of a symbol sequence. In other words, when a sampling point is shifted for one symbol sequence forwards or backwards from the ideal sampling point and a cross-correlation between the obtained training sequence and the stored training sequence is calculated, the result is zero in the ideal case. However, if multi-path propagation appears in the radio channel, values deviating from zero, i.e. power, starts appearing at these cross-correlation zero points. In this specification, the term cross-correlation zero point refers to the above-described cross-correlation determined at the distance of one symbol sequence from the maximum of the cross-correlation, which, in the ideal case, when there is no interference on the radio path, gives a result of zero, but which is not necessarily zero if interference occurs.

It is typical of the radio path that the transmitted signal arrives in the receiver over several propagation paths, each of which having a specific time delay, and in addition, the channel properties change as a function of time. For instance, beams reflected and delayed on the radio path generate intersymbol interference (ISI). The frequency response or the impulse response of the channel can be estimated by a discrete-time filter, i.e. a channel estimator, whose tap coefficients model the radio channel. The aim is to describe the state of the radio channel by a channel estimate. In the present specification, the channel estimator generally refers to a mechanism that estimates and maintains a description of the complex impulse response of the radio channel. A method by which the channel estimate is updated is substantially associated with this mechanism. In the TETRA system, a least mean square (LMS) algorithm, for instance, can be used for updating the channel estimates. In order to ensure that the LMS algorithm is converged before the start of the actual information bits, the detector 103A or 103B must obtain the best possible initial estimate of the state of the channel. This estimate is obtained from the synchronization 100 which calculates a complex cross-correlation between the training sequence 21 of the received signal and the stored version of the training sequence when searching an optimal sampling moment. The cross-correlation result provides an initial value for the channel estimate, the initial value indicating an average state of the channel during the training sequence. Channel correction and symbol detection will not begin until the training sequence is received. This ensures that the symbol synchronization is able to adjust the timing of symbols as accurately as possible and to generate the initial estimate of the channel. The channel correction both in the forward direction and in the backward direction preferably proceeds such that, after initializing the estimates, the detector 103A or 103B is trained over the training sequence 21 towards the end of the burst or towards the beginning of the burst, respectively. Consequently, if multipath propagation occurs considerably, it is more preferable to use a detector provided with a channel equalizer, and on the other hand, if multipath propagation does not occur, a conventional differential detector, for instance, can be used as the detector.

The synchronizing block 100 supplies the received signal frame to a selector unit 102 which selects the detector 103A or 103B to be used on the basis of the correlation data and forwards the frame to the selected detector block 103A or 103B via an output A or B. The detector 103A or 103B detects the information bits and the optional channel equalizer associated therewith corrects non-idealities caused by the radio channel in a known manner, as described above. Finally, in framing 104, the frame is formed into a logical channel that is forwarded for further processing OUT.

According to a preferred embodiment of the invention, in synchronization 100, the complex cross-correlation between the training sequence 21 of the received signal and the stored training sequence at one zero point or both of the zero points of the cross-correlation is determined as defined above. If the cross-correlation is calculated at either zero point, it is possible to calculate an average of the two obtained values or they can be summed, whereby one cross-correlation value is obtained. Alternatively, it is also possible to use two, separate cross-correlation values in further processing. By means of the absolute value(s) of the obtained cross-correlation, the detector 103A or 103B to be used for symbol detection is selected with the selector 102. One of the equalizers, e.g. 103A, preferably comprises a channel equalizer, and consequently, if the absolute value of the determined complex cross-correlation exceeds a given preset limit value, the detector 103A provided with the channel equalizer is used, and if the absolute value of the determined complex cross-correlation is below a given preset limit value, the other detector 103B, which is e.g. a differential detector, is used. There may be more than two detector types and they may differ from the above-described detectors without that it has any relevance to the basic idea of the invention. Preferably, only the detector 103A or 103B that is used for detection is in operation, which minimizes the computational power required for detection.

Further, according to the preferred embodiment of the invention, the selection of the detector 103A or 103B is carried out by averaging the cross-correlation values of a plurality of received time slots. This can be done by means of an averager 101 which receives the correlation data from the synchronization 100, as illustrated in FIG. 1. The calculated average data, on the basis of which the selection of detector is performed, is thus applied to the selector 102. The average is calculated, for instance, after each received burst for a given number of preceding bursts. The selection 102 of the detector is performed e.g. by comparing the average with a predetermined limit value as is described in the above.

For ease of understanding the invention, one example of the general structure of the receiver is described in the above. However, the structure of the receiver may vary without deviating from the present invention. It is obvious to the person skilled in the art that as technology progresses the basic idea of the invention can be implemented in a variety of ways. Thus, the invention and its embodiments are not restricted to the above-described examples, but they may vary within the scope of the claims.

What is claimed is:

1. A method for selecting a modulation detector in a receiver which includes at least a first and a second detector, the method comprising:

determining at least one cross-correlation value between a stored training sequence and at least one training sequence of a received signal; and selecting a detector used for detection of a signal to be received on the basis of the determined at least one cross-correlation value, wherein the received signal is a complex signal, whereby at least one cross-correlation value to be determined is a complex cross-correlation value and wherein the determining at least one cross-correlation value is performed for a given number of training sequences of the received signal, and the method further comprises:

calculating an absolute value of an average of the determined cross-correlation values;

selecting the first detector for the detection of the signal to be received if the absolute value of the average of the cross-correlation values exceeds a preset limit value; and selecting the second detector if the absolute value of the average of the cross-correlation values is below a preset limit value.

2. The method of claim 1, wherein determining at least one cross-correlation value further comprises:

searching for an ideal synchronization point of the received signal, at which point the cross-correlation between the training sequence of the received signal and the stored training sequence has a maximum value; and calculating the cross-correlation value between the stored training sequence and the training sequence of the received signal, which is obtained by shifting a synchronization point of the received signal for one symbol sequence at least one of forwards or backwards from the ideal synchronization point.

3. The method of claim 1, wherein the first detector includes a channel equalizer.

4. A receiver comprising:

a first and a second modulation detector;

means for determining at least one cross-correlation value between at least one training sequence of a received signal and a stored training sequence; and means for selecting a detector used for detection of a signal to be received based on the determined at least one cross-correlation value, wherein the received signal is a complex signal, whereby at least one cross-correlation value to be determined is a complex cross-correlation value, and wherein the receiver further comprises:

means for collecting a predetermined number of cross-correlation values determined from the training sequences of the received signal; and means for calculating an absolute value of an average of the determined cross-correlation values, wherein the means for selecting is configured to select the first detector for the detection of the signal to be received if the absolute value of the average of the cross-correlation values exceeds a preset limit value, and configured to select the second detector if the absolute value of the average of the cross-correlation values is below the preset limit value.

5. The receiver of claim 4, wherein the means for determining at least one cross-correlation value is configured to search for an ideal synchronization point of the received signal, at which point the cross-correlation between the training sequence of the received signal and the stored training sequence has a maximum value, and to calculate the cross-correlation value between the stored training sequence and the training sequence of the received signal, which is obtained by shifting a synchronization point of the received signal for one symbol sequence at least one of forwards or backwards from the ideal synchronization point.

6. The receiver of claim 4, wherein the first detector includes a channel equalizer.

7. A receiver comprising:

a first and a second modulation detector configured to detect a received signal;

determination module configured to determine at least one cross-correlation value between at least one training sequence of a received signal and a stored training sequence; and a first selector configured to select between the first and second modulation detectors, wherein the first and second modulation detectors are configured to detect the received signal based on the determined at least one cross-correlation value, wherein the received signal is a complex signal, whereby at least one cross-correlation value to be determined is a complex cross-correlation value the receiver further comprising:

a collector configured to collect a predetermined number of cross-correlation values determined from the training sequences of the received signal;

a second calculator configured to calculate an absolute value of an average of the determined cross-correlation values;

wherein the selector is configured to select the first detector for the detection of the signal to be received if the absolute value of the average of the cross-correlation values exceeds a preset limit value and configured to select the second detector if the absolute value of the average of the cross-correlation values is below the preset limit value.

8. The receiver of claim 7, wherein the determination module comprises:

a searcher configured to search for an ideal synchronization point of the received signal, at which point the cross-correlation between the training sequence of the received signal and the stored training sequence has a maximum value; and a first calculator configured to calculate the cross-correlation value between the stored training sequence and the training sequence of the received signal, which is obtained by shifting a synchronization point of the received signal for one symbol sequence at least one of forwards or backwards from the ideal synchronization point.

9. The receiver of claim 7, wherein the first detector includes a channel equalizer.

* * * * *

UNITED STATES PATENT AND TRADEMARK OFFICE
CERTIFICATE OF CORRECTION

PATENT NO. : 7,058,148 B1 Page 1 of 1
APPLICATION NO. : 09/807131
DATED : June 6, 2006
INVENTOR(S) : Mikko Huttunen It is certified that error appears in the above-identified patent and that said Letters Patent is hereby corrected as shown below:

On title page, item 54 Title
 replace "MODULATION DETECTION"
 with --MODULATION DETECTOR--.

Signed and Sealed this

Nineteenth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,058,148 B1
APPLICATION NO. : 09/807131
DATED : June 6, 2006
INVENTOR(S) : Mikko Huttunen It is certified that error appears in the above-identified patent and that said Letters Patent is hereby corrected as shown below:

On title page, item 54 Title
..replace "MODULATION DETECTION"
..with --MODULATOR DETECTOR--.

Signed and Sealed this

Fourteenth Day of October, 2008

JON W. DUDAS
*Director of the United States Patent and Trademark Office*

UNITED STATES PATENT AND TRADEMARK OFFICE
CERTIFICATE OF CORRECTION

PATENT NO. : 7,058,148 B1  Page 1 of 1
APPLICATION NO. : 09/807131
DATED : June 6, 2006
INVENTOR(S) : Mikko Huttunen It is certified that error appears in the above-identified patent and that said Letters Patent is hereby corrected as shown below:

On title page, item 54 and Column 1, lines 1 and 2 Title
..replace "MODULATION DETECTION"
..with --MODULATION DETECTOR--.

This certificate supersedes the Certificate of Correction issued October 14, 2008.

Signed and Sealed this

Fourth Day of November, 2008

JON W. DUDAS
*Director of the United States Patent and Trademark Office*

UNITED STATES PATENT AND TRADEMARK OFFICE
CERTIFICATE OF CORRECTION

PATENT NO. : 7,058,148 B1
APPLICATION NO. : 09/807131
DATED : June 6, 2006
INVENTOR(S) : Mikko Huttunen It is certified that error appears in the above-identified patent and that said Letters Patent is hereby corrected as shown below:

On the Title page, item (73) should read – Assignee: EADS Secure Networks OY, Helsinki (FI).

Signed and Sealed this

Seventeenth Day of February, 2009

JOHN DOLL
*Acting Director of the United States Patent and Trademark Office*